D. SAGER.
Butter-Worker.
No. 160,548.  Patented March 9, 1875.
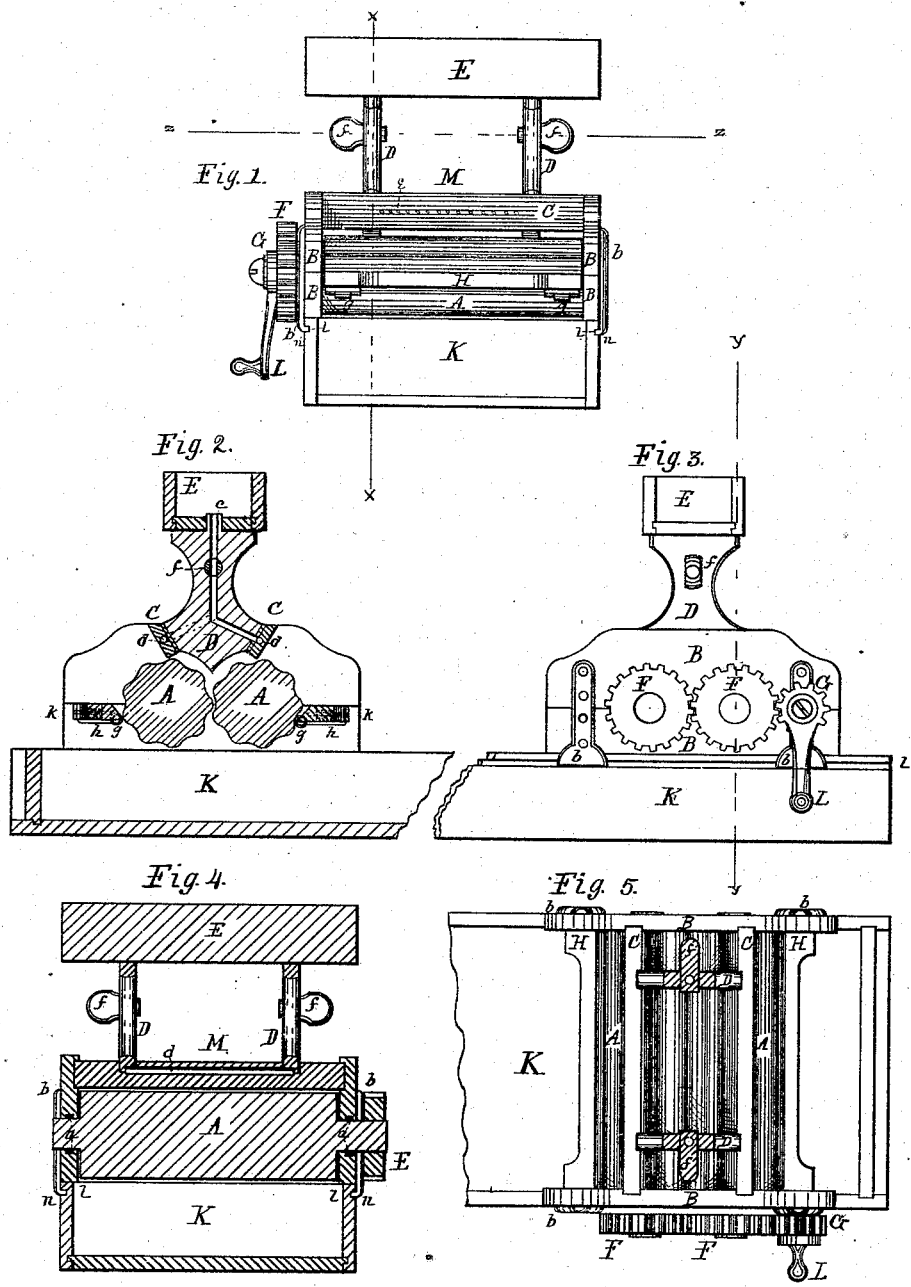
Witnesses
Jacob Behel
A. O. Behel
Inventor
Daniel Sager

UNITED STATES PATENT OFFICE.

DANIEL SAGER, OF BELVIDERE, ILLINOIS.

IMPROVEMENT IN BUTTER-WORKERS.

Specification forming part of Letters Patent No. 160,548, dated March 9, 1875; application filed June 6, 1874.

*To all whom it may concern:*

Be it known that I, DANIEL SAGER, of Belvidere, in the county of Boone and State of Illinois, have invented a Machine for Working Butter, of which the following is a specification:

The object of my invention is to provide a convenient, cheap, and effective machine for working butter rapidly, in an even manner, and that will least injure it. To this end I have devised, arranged, and constructed the machine hereinafter described.

In the drawings hereunto annexed, Figure 1 is a side elevation. Fig. 2 is a vertical transverse section, taken on dotted line $x$. Fig. 3 is an end elevation. Fig. 4 is a longitudinal section on dotted line $y$. Fig. 5 is a plan view below dotted line $z$.

In the figures, A are the working rollers, the journals of which are fitted with suitable metallic rings $a$, and have their bearings in the end boards B, which are in two parts and are held together by brackets $b$, thus securing the rollers A in position. The end boards B are connected by inclined boards C, which form the sides of the hopper and are placed at such angles as to conduct the butter, when placed in the hopper, over the summit of the rollers and toward the center between them. The ends of the hopper are formed by uprights D placed between the inclined boards C and at a proper distance from their ends toward the center of their length, for the purpose of preventing the butter from reaching the ends of the rollers in working, and being injured between the ends of the rollers and the end boards in which they have their bearings. A suitable receptacle, E, is mounted on the uprights D or located in a plane higher than the rollers A. These uprights are bored, forming tubes as at $c$, which connect with the receptacle E and with tubes $d$ in the sides D. The tubes $d$ extend the length of the hopper, and are provided with small openings $e$ at suitable intervals throughout their length. By preference these small openings are on the outsides of boards C. The tubes are intercepted by spigots $f$ between the receptacle E and the discharge-openings $e$. The object of this part of my invention is to provide a receptacle for the reception of brine or any other suitable liquid or liquid compound, and is provided with ducts and spigots to conduct and control its flow onto the working rollers, in contact with the butter during the working thereof, for the purposes of purifying and preserving the butter, and preventing it from adhering to the rollers during the operation.

The working rollers A are corrugated longitudinally, and of such form, and placed in such relative position to each other, that the prominences on the one will come opposite the depressions in the other, but not in close contact, and are held and made to revolve in this relative position by means of toothed wheels F, fitted and secured on the outward-projecting ends of the journals of the rollers A, and the form of the corrugations are such that during their revolutions the space between the rollers will be preserved, being always the same or nearly the same, so that the butter in passing through will be in web form of nearly equal thickness. A tooth-wheel, G, is secured to the end frame B in working position, with one of the toothed wheels F, and is fitted with a winch, L, by means of which the working rollers are made to revolve. H are cleaners with beveled or shear-formed edges, and near their ends are fitted with friction-rollers $g$, which project slightly beyond their edges. These cleaners are placed on the outsides of rollers A and their ends are received in mortises in the end boards B, and are held in working contact with the rollers by spiral springs $h$ on pins $k$ in ends of cleaners H, the friction-rollers $g$ coming in actual contact with the working rollers A, which, in combination with the spiral spring $h$, control their movements, and are made to conform to the corrugations of the rollers for the purpose of removing butter that may from any cause adhere to the rollers. K is a box or receptacle into which butter may be placed preparatory to working it, and also to receive the butter from the worker. This receptacle is provided with grooved ways $l$ to receive the hooks $n$ on the lower ends of brackets $b$, in which they will slide for the purpose of placing the worker in any convenient position on the receptacle and holding it in connection therewith.

In using the machine, the butter to be worked is placed in the hopper M, in contact with the working rollers, and the receptacle E being provided with any suitable liquid, and the spigots being adjusted to regulate the flow thereof, the rollers are made to revolve by means of the winch L. The butter will be forced down between the rollers in web form, by pressure, in contact with the purifying and preserving liquids, into the receptacle K, from which, after proper working, it may be removed and packed or otherwise prepared for the market or use.

I claim as my invention—

1. The fluid-receptacle E, fluid-passages $c\ d$, and outlets $e$, in combination with the corrugated rollers A, as and for the purposes described.

2. The butter-worker herein described, composed of the fluid-passages $c\ d$, in uprights D, corrugated rollers A, self-acting cleaners H, and receptacle K, the parts arranged with relation to each other, substantially as and for the purpose described.

DANIEL SAGER.

Witnesses:
JAMES FERGUSON,
JACOB BEHEL.